(12) United States Patent
Perumal et al.

(10) Patent No.: US 7,106,760 B1
(45) Date of Patent: Sep. 12, 2006

(54) CHANNEL BONDING IN SHDSL SYSTEMS

(75) Inventors: Sathi Perumal, Fremont, CA (US);
Trevor Pearman, Sunnyvale, CA (US);
Simon Huang, San Jose, CA (US);
Steven R. Blackwell, Huntsville, AL (US)

(73) Assignee: Centillium Communications, Inc., Fremont, CA (US)

( * ) Notice: Subject to any disclaimer, the term of this patent is extended or adjusted under 35 U.S.C. 154(b) by 992 days.

(21) Appl. No.: 10/112,622

(22) Filed: Mar. 29, 2002

(51) Int. Cl.
*H04J 1/00* (2006.01)
(52) U.S. Cl. ..................................... 370/535; 370/536
(58) Field of Classification Search ................ 370/493, 370/494, 495, 535, 536
See application file for complete search history.

(56) References Cited

U.S. PATENT DOCUMENTS

| 6,798,769 | B1* | 9/2004 | Farmwald | 370/352 |
| 6,879,590 | B1* | 4/2005 | Pedersen et al. | 370/394 |
| 2003/0048802 | A1* | 3/2003 | Shenoi | 370/458 |
| 2003/0091053 | A1* | 5/2003 | Tzannes et al. | 370/395.1 |
| 2003/0108063 | A1* | 6/2003 | Joseph et al. | 370/465 |
| 2005/0152385 | A1* | 7/2005 | Cioffi | 370/420 |
| 2005/0286424 | A1* | 12/2005 | Peeters et al. | 370/235 |

OTHER PUBLICATIONS

Heard, "HEC Tutorial," Cell-Relay List [online]. Indiana (IN): Indiana University, Oct. 10, 1994; 10:04:15 PDT [retrieved on Jul. 3, 2002]. Retrieved from the Internet: <URL:http://cell-relay.Indiana.edu/cell-relay/publications/software/CRC/32bitCRC.tutorial.html>.
Zarlink Semiconductor, "An Introduction to MVIP™ and Details on Implementation using the MT90810," Application Note MSAN-148, Sep. 1994, pp. A-265 through A-278.
Mitel Semiconductor, "Multi-Vendor Integration Protocol," MVIP-90 Standard, Release 1.1, Oct. 1994, 26 pages.
Hsu et al., "Dynamic Bandwidth Allocation for ATM Switches," Dept. of EECS, University of California, Berkeley, California, 1995, 16 pages.
Mitel Semiconductor, "Multi-Vendor Integration Protocol," H-MVIP Standard, Release 1.1a, Jan. 1997, 23 pages.
PMC-Sierra, Inc., "PM4388 TOCTL Technical Overview," May 1997, 20 pages.
Siemens Semiconductor Group, "Quad ISDN 2B1Q Echocanceller Digital Front End," ICs for Communications Data Sheet, PEB/PEF 24911 Version 1.2, Dec. 1997, 14 pages.
PMC-Sierra, Inc., "COMET Combined E1/T1Transceiver Technical Overview," May 1998, 23 pages.
Gupta et al., "Distributed dynamic bandwidth allocation and management for self-healing broadband networks with multi-class traffic," IEEE GLOBECOM 98 Conference, Sydney, Nov. 1998, pp. 1171.
PMC-Sierra, Inc., "PM4388 TOCTL Octal T1 Framer Datasheet," Nov. 1998, 17 pages.
International Telecommunication Union, "B-ISDN user-network interface—Physical layer specification: General Characteristics," ITU-T Recommendation I.432.1, Feb. 1999, 22 pages.

(Continued)

Primary Examiner—Melvin Marcelo
(74) Attorney, Agent, or Firm—Fenwick & West LLP

(57) ABSTRACT

Techniques for carrying out multi-pair mode transmission in a DSL system are disclosed. A data stream is transmitted to a receiving node on two or more bonded channels. At the receiving node, the bonded channels are processed to yield the original data stream. Differential delay between the two or more channels of the bond group is dynamically neutralized by keying on the channel having the greatest latency, although static mechanisms for neutralizing the differential delay can also be used.

30 Claims, 9 Drawing Sheets

OTHER PUBLICATIONS

"High bit rate Digital Subscriber Line—2nd Generation (HDSL2). Draft for HDSL2 Standard, Default Letter Ballot," ComitteeT1—Telecommunications, Dec. 6-10, 1999, 95 pages.

Infineon Technologies, "DuSLIC: Dual Channel Subscriber Line Interface Circuit," Data Sheet, Jul. 2000, 18 pages.

PMC-Sierra, Inc., "PM4351 COMET Combined E1/T1Transceiver/ Framer Technical Overview," Data Sheet, Oct. 2000, 12 pages.

Infineon Technologies, "DFE-Q V2.1 Quad ISDN 2B1Q Echocanceller Digital Front End," PEF 24911 Version 2.1, Data Sheet, Nov. 2000, 16 pages.

Zarlink Semiconductor, "ST-BUS Generic Device Specification," Application Note MSAN-126 (Reb. B), 2001, 10 pages.

Centillium Communications, Inc., "Octal-Port SHDSL Transceiver Chipsets for Central Office," CopperSym™ CT-S23SC08 Advance Product Brief Version 0.5, Apr. 2001, 2 pages.

Blackwell, "Recommendation G.991.2 -Single-Pair High-Speed Digital Subscriber Line (SHDSL) Transceivers—Final Draft Text," ITU—Telecommunication Standardization Sector, Apr. 9-13, 2001, 209 pages.

Infineon, Centillium, Siemens, "G.shdsl.bis, G.hs.ter: Extending the 4-Wire Mode to Multiple pairs," ITU-Telecommunication Standardization Sector Temporary Document FC-041, Dec. 2001, 10 pages.

* cited by examiner

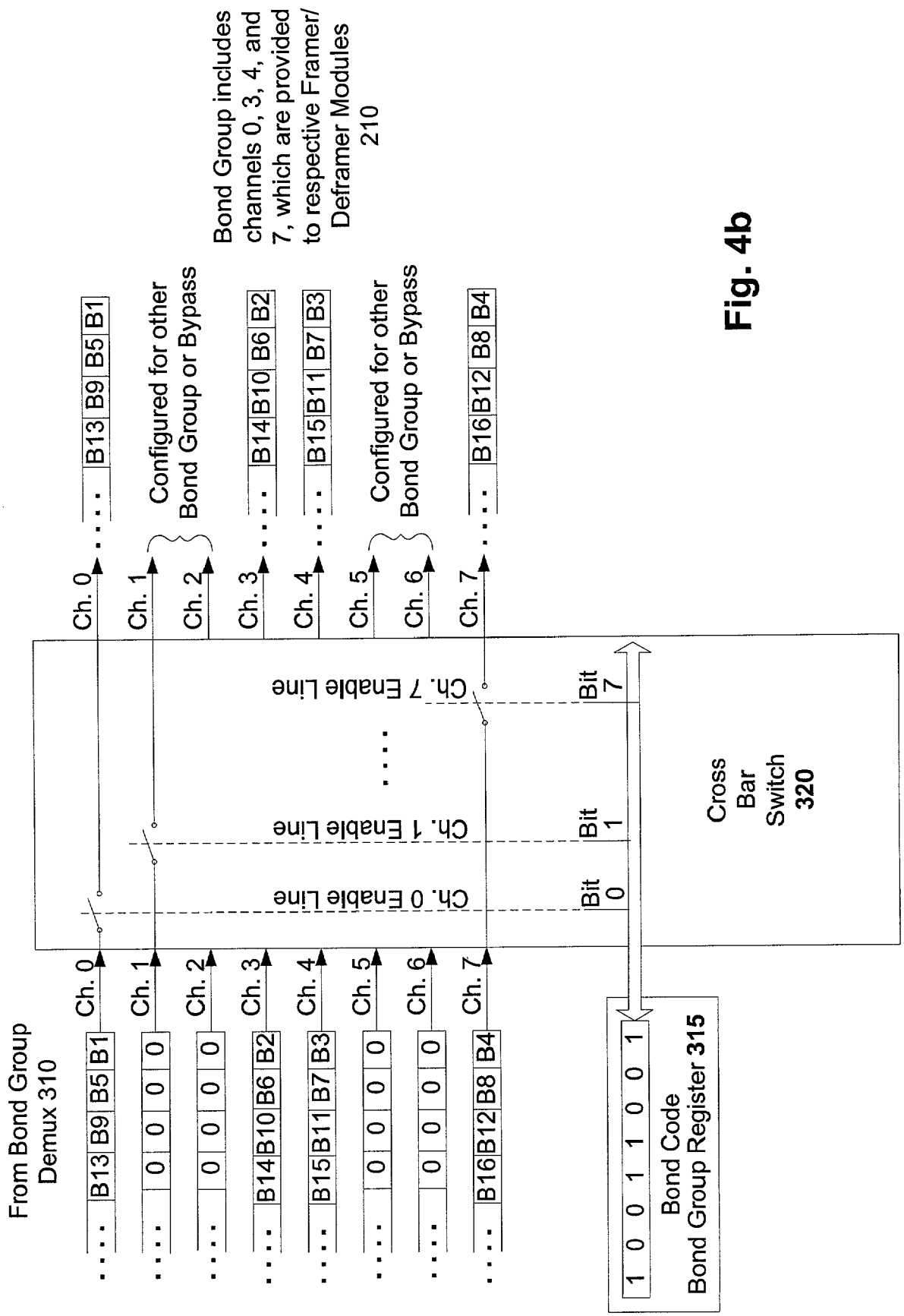

CHANNEL BONDING IN SHDSL SYSTEMS

RELATED APPLICATIONS

This application is related to U.S. application Ser. No. 09/991,524, filed Nov. 16, 2001, entitled "Dynamic Bandwidth Allocation in DSL Systems" (which claims the benefit of U.S. Provisional Application No. 60/273,182, filed Mar. 2, 2001), and is also related to U.S. Application No. 10/112, 672, filed Mar. 29, 2002entitled "Dynamic Data Allocation in Communication Systems." Each of these applications is herein incorporated in its entirety by reference.

FIELD OF THE INVENTION

The invention relates to telecommunications, and more particularly, to channel bonding techniques for digital subscriber line systems.

BACKGROUND OF THE INVENTION

The Telecommunications Standards Section of the International Telecommunication Union (ITU-T) develops recommendations to facilitate the interoperation of telecommunication networks. One of these recommendations is referred to as G.991.2, which is herein incoroparated by reference in its entirety. ITU-T Recommendation G.991.2 describes a digital subscriber line (DSL) standard referred to as G.SHDSL (Symmetric High-bit-rate DSL or Single-pair High-speed DSL). SHDSL transceivers, which are able to transmit and receive multiple data types over a single connection, are designed primarily for duplex operation over mixed gauge two-wire twisted metallic pairs. In addition, an optional multi-pair (four-wire or two-pair) operation is supported.

In the multi-pair mode, payload data is interleaved between wire-pairs 1 and 2 as discussed in G.991.2. In short, the multi-pair mode allows a single data stream to be divided up between and transmitted over the wire-pairs thereby increasing transmission bandwidth for that data stream. However, G.991.2 does not currently define an architecture for carrying out the multi-pair mode. Moreover, the data stream data transmitted by one pair invariably arrives at the destination at different times than the data stream data transmitted over the other pair. This is because the pairs that a given stream is transmitted over often have distinct transmission characteristics (e.g., regenerators, wire thickness, temperature, length). Efficiently contending with this transmission delay in reassembling the original data stream at the receiving node is not a trivial task.

What is needed, therefore, are techniques for carrying out multi-pair mode transmission in a DSL system.

SUMMARY OF THE INVENTION

Techniques for carrying out multi-pair mode transmission in a DSL system are disclosed. A data stream is transmitted to a receiving node on two or more channels. In this sense, the channels that carry the data stream data are bonded together. At the receiving node, the bonded channels or "bond group" are processed to yield the original data stream. Differential delay between the two or more channels of the bond group is dynamically neutralized by keying on the channel with the greatest latency. Alternative embodiments can employ static mechanisms for neutralizing the differential delay (e.g., over-sized differential delay buffer, or pre-established differential delay based on empirical data or training sequence). The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 4b is a diagram illustrating bond group channel flow through a cross bar switch in accordance with one embodiment of the present invention.

DETAILED DESCRIPTION OF THE INVENTION

Figure 1:
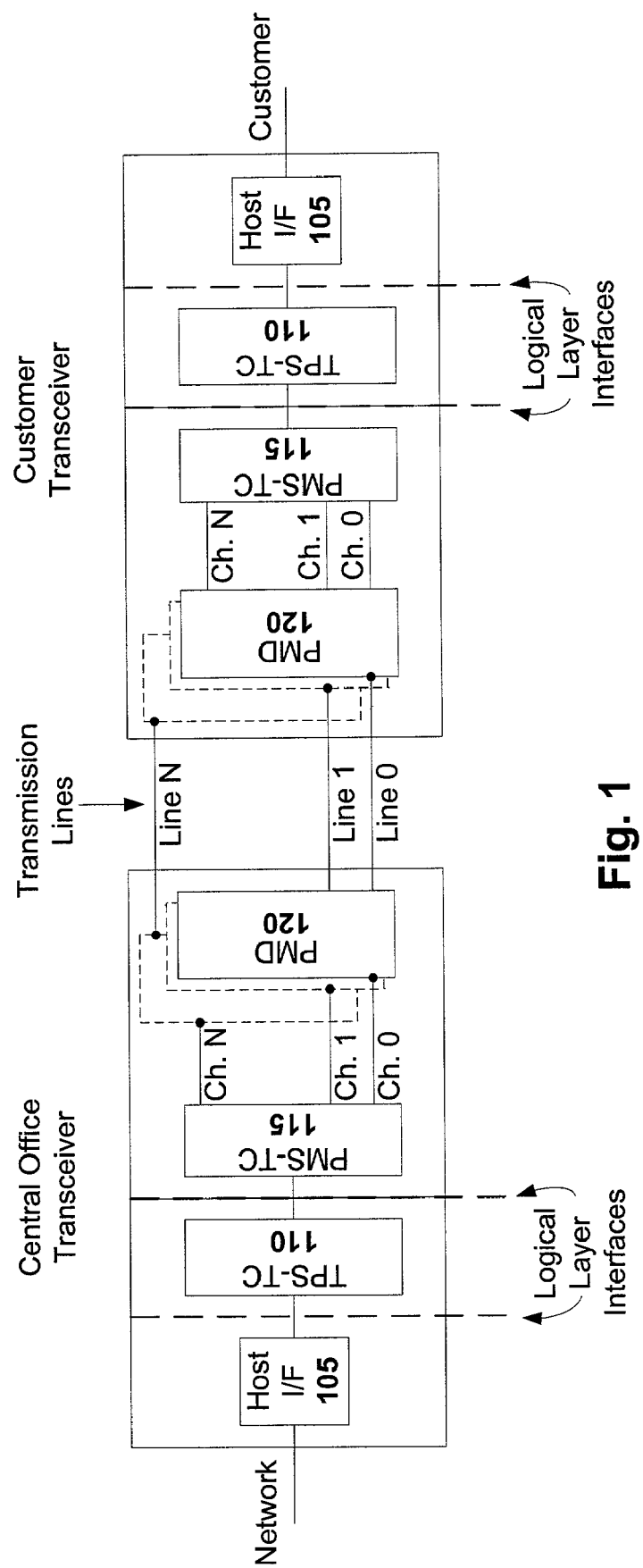
FIG. 1 illustrates the functional blocks and interfaces of a multi-port transceiver pair coupled via transmission lines.

A data stream can be readily transmitted between DSL transceivers over a single twisted pair. By transmitting that data stream over multiple twisted pairs, however, significantly increasing the data rate at which the data stream is transmitted. Thus, transceivers that are configured to operate in an optional multi-pair mode can be highly desirable. Disclosed herein are techniques for carrying out this optional multi-pair mode, which is herein referred to as N channel bonding.

General Overview

N-Channel bonding is a technique that provides more transmission bandwidth by dividing a serial data stream into multiple identical framed channels, and coupling those channels to their respective transmission lines. The channels that carry the data from a given serial data stream are referred to as a bond group. The data at the receiving node are recombined from the multiple transmission lines of the bond group to form the original serial data stream. Differential delay between the two or more channels of the bond group is neutralized at the receiver. The number of channels that can be bonded together is 2 or more (e.g., all N channels on an N-port chip or chip set). Although each serial data stream can be associated with its own bond group, there is also a bypass mechanism that allows a serial data stream to be transmitted without being bonded (the stream is transmitted over one channel). The data type can be different for each bond group.

In one embodiment of the present invention, the N-channel bonding techniques are employed in the framer/deframer blocks of an SHDSL-based system. Consider, for example, a system having an 8-port SHDSL transceiver pair. In such a system, the transceivers communicate with one another over eight different transmission lines (e.g., twisted pairs) thereby providing eight distinct channels of communication. Assuming the minimum number of channels in a bond group is two, then up to four bond groups are possible. Note, however, that all eight channels can be included in a single bond group. The channels of any one bond group are configured the same (e.g., same data rate and framing parameters). Note that a channel can be configured as two or more subchannels. In such a case, the data from a serial data stream assigned to that channel can be further divided among the subchannels.

A selection mechanism (e.g., programmable register or logic array) associated with each bond group indicates which channels are to be bonded together. There are no restrictions on which channels can be bonded together, and all combinations are acceptable. For example, assuming an eight channel (0 to 7) system and four possible bond groups (A, B, C, and D): bond group A might include channels 0, 2; bond group B might include channels 1, 3, 7; bond group C might include channels 4, 6; and channel 5 is not bonded (bypass mechanism). In this example, there is no need to have a fourth bond group D.

For purposes of clarity and facilitating understanding, the functional layers and modes of operation of a DSL system transceiver pair are initially discussed. A bond grouping module that operates in accordance with principles of the present invention is then described. Embodiments for both transmission and receiver architecture of the bond grouping module are then disclosed. The discussion continues with techniques for neutralizing differential delay between the channels of a bond group.

Functional Layers of a DSL System

FIG. 1 illustrates the functional blocks and interfaces of a multi-port transceiver pair coupled via transmission lines. Each transceiver has an application invariant section and an application specific section. The application invariant section includes N physical media dependent (PMD) layers 120 and a common physical media-specific transmission convergence (PMS-TC) layer 115, while the application specific section includes a transmission protocol-specific transmission convergence (TPS-TC) layer 110 and a number of host interface (I/F) blocks 105. The functions at the customer premises side are carried out by the customer transceiver (sometimes referred to as network termination or xTU-R), while functions at the central office side are carried out by the central office transceiver (sometimes referred to as line termination or xTU-C).

The system may be, for example, an SHDSL-based system. However, the principles of the present invention can be implemented in other DSL systems having similar multi-pair mode functionality as will be apparent in light of this disclosure. In addition, note that the system illustrated may be configured with additional components, such as one or more signal regenerators coupled between the transceivers along each of the transmission lines to ensure a strong transmission signal over long distances. The number and location of such regenerators depends on factors such as insertion loss and transmission characteristics of the transmission lines. In addition, system features such as management functions (typically controlled by an operator's network management system) and remote power feeding may be added to the system as necessary.

In general, a transceiver pair and a transmission line by which they are coupled (sometimes referred to as a digital local line), and any regenerators units make up a DSL span. The transmission lines may be, for example, copper twisted pairs (also referred to as loops).

Layer Functions and Interfaces

The principal functions of a PMD layer 120 include link startup and line equalization, as well as symbol timing generation and recovery, coding and decoding, modulation and demodulation, analog-digital conversion, and echo cancellation. The PMS-TC layer 115 functions include framing and frame synchronization functions, as well as scrambler and descrambler functions. Embodiments of the present invention discussed herein generally operate in the PMS-TC layer 115. However, this is not intended to be a limitation on the present invention, which can operate in any layer generally equivalent to a PMS-TC layer. The PMS-TC layer 115 is connected across a logical interface to the TPS-TC layer 110. The TPS-TC layer 110 is application specific and generally operates to package user data within a transmission frame. Functionality here may include multiplexing, demultiplexing, and timing alignment of multiple user data channels. The TPS-TC layer 110 communicates with one or more host interface blocks 105 across a logical interface thereby providing support for channels of user serial data streams. Note that the logical interfaces are not intended to imply a physical implementation.

Modes of PMD Layer

The PMD layer 120 is associated with various modes of operation including a data mode, an activation mode, and a preactivation mode. The data mode operates after activation procedures have been completed, and allows payload to be communicated between the communicatively coupled transceivers. The activation mode operates before the data mode is entered, and generally establishes a communication link with required transmission parameters between the physically connected and powered transceivers. The activation mode can also be used to modify transmission parameters of the communication link.

The preactivation mode operates before the activation mode is entered, and generally includes one or more handshake sessions and line probing ("training") sequences. Handshake sessions (G.994.1) provide a mechanism for exchanging capabilities and negotiating the operational parameters for each transceiver connection. Line probe sequences provide a mechanism to identify or otherwise derive characteristics of the transmission medium, such as achievable SNR.

Code points or messages exchanged during a handshake session can be used to enable the multi-pair mode and specify the number of wire-pairs that will be used. In addition, the handshake session can be used to establish the configuration (e.g., data rate and framing parameters) of the communication channels associated with the wire-pairs. The handshake session can further be used to indicate the particular channels that will be bonded together, as well as the particular serial data stream that will be transmitted by way of the bond group formed by those channels in accordance with the principles of the present invention.

Modes of PMS-TC Layer

The PMS-TC layer 115 is also associated with the data and activation modes. As is known, an activation frame generally includes frame sync bits and can be used to specify the likes of precoder and encoder coefficients, proprietary vendor data, and error checking information (e.g., CRC). In addition, a field in the activation frame can be used to indicate multi-pair mode information to effect the principles of the present invention. For example, the particular channels that will be bonded together, as well as the particular serial data stream that will be transmitted by way of the bond group formed by those channels can be specified in a field.

In one embodiment, a 5-bit field in the activation frame (e.g., included in reserved bits 4145 to 4211 of an SHDSL activation frame) can be used as an index that specifies a pre-established multi-pair scheme that the communicating transceivers can effect. A look-up table can then be used to associate the specified index with the corresponding scheme. For instance, a multi-pair scheme code of 10110 might correspond to a multi-pair scheme having eight channels (0 to 7), where a bond group A includes channels 0, 2; a bond group B includes channels 1, 3, 7; a bond group C includes channels 4, 6; and channel 5 is not bonded. Another activation frame field (e.g., 3-bits) can be used to specify a given serial data stream that is to be associated with a particular bond group.

Alternatively, the bond groups can also be defined at connection time based on available transmission lines (wire-pairs) at the time service is requested, and handshake code points or another suitable messaging scheme can then be used to enable multi-pair mode and specify the number of wire-pairs that will be used.

Figure 2:
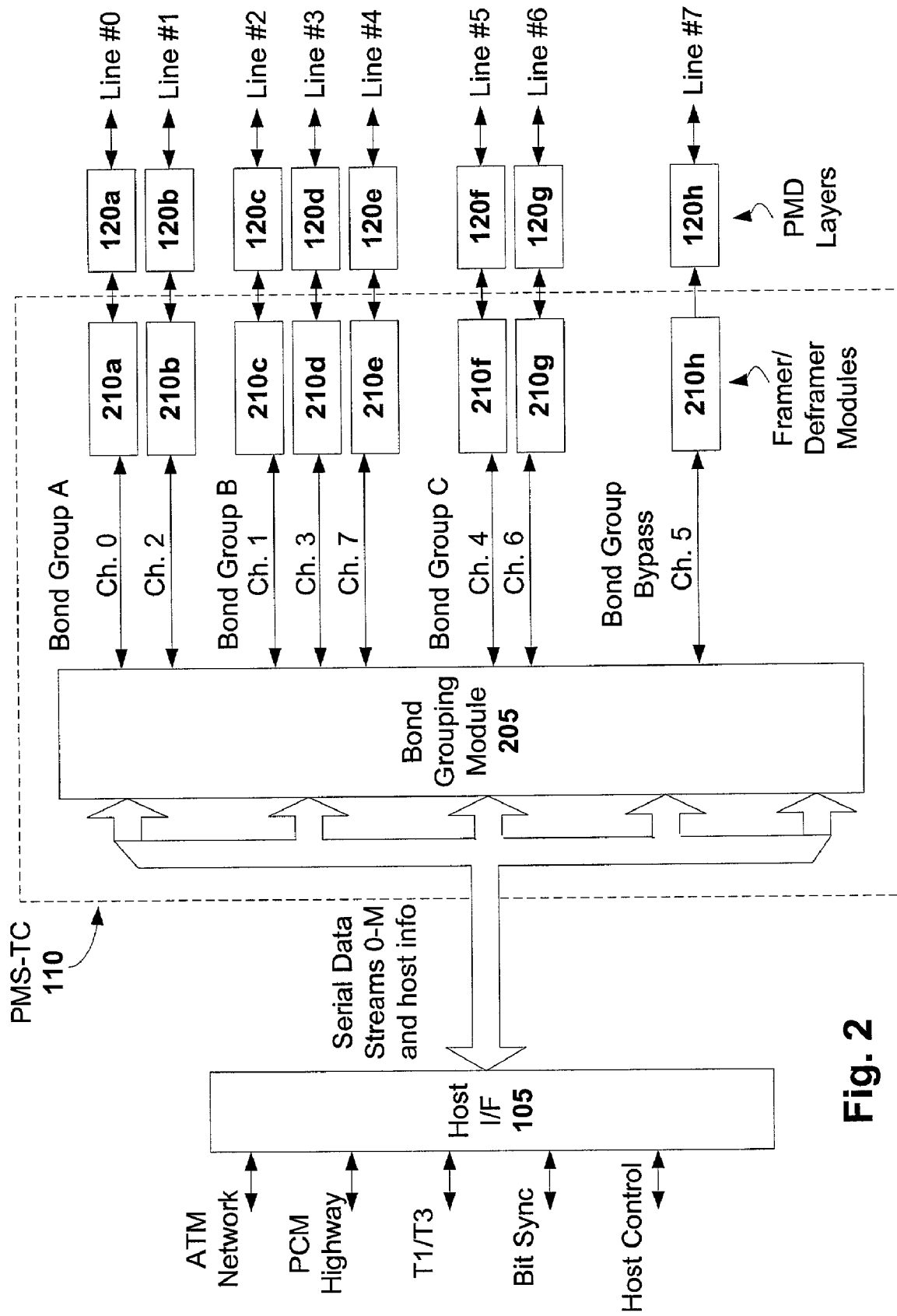
FIG. 2 is a block diagram illustrating the PMS-TC layer of an SHDSL transceiver in accordance with one embodiment of the present invention.

FIG. 2 is a block diagram illustrating the PMS-TC layer of an SHDSL transceiver in accordance with one embodiment of the present invention. The host interface 105 receives a number (e.g., M=8) of serial data streams, such as ATM network cell data, PCM highway data, T1/T3 data, and Bit sync data. Other serial data protocols can be used here as well. The host interface 105 can also receive control information from the host, such as host commands (e.g., multi-pair mode information such as bond codes and select codes). Note that there may be a host interface 105 for each type of serial data stream or other communication. Each of the data streams and control information are operatively coupled to the PMS-TC layer 110 (e.g., via the TPS-TC layer 110, which is not shown).

In this embodiment, the PMS-TC layer 110 includes a bond grouping module 205 that is configured with eight channels (0 to 7) of communication. As such, it is possible that four bond groups (A, B, C, and D) of two channels each can be provided. In addition, a bypass mechanism is provided for one or more streams. Thus, a total of M distinct serial data streams can be processed by the bond grouping module 205. In this example, each potential bond group and the bypass mechanism of the bond grouping module 205 receive all M serial data streams. The host control information can be used to assign a particular serial data stream to a particular bond group, or to the bypass. Likewise, the host control information can be used to define what channels will be bonded together for carrying data of the assigned serial data stream. Note that the particular stream assigned to a bond group or bypass can be statically assigned as well. For example, only one stream could be provided to each potential bond group, and one or more streams could be provided to the bypass thereby eliminating the need for a dynamic selection or assignment.

As can be seen in this example, one serial data stream is assigned to bond group A, which includes channels 0 and 2; a second serial data stream is assigned to bond group B, which includes channels 1, 3, and 7; a third serial data stream is assigned to bond group C, which includes channels 4 and 6; and a fourth serial data stream is assigned to the bond group bypass, which is channel 5. Here, there is no fourth bond group D. Each of channels 0 to 7 is coupled to a corresponding framer/deframer module 210. Each framer 210 frames the channel data for transmission over a transmission line (e.g., twisted pair) via the corresponding PMD layer 120. In a similar fashion, each deframer 210 deframes data received from a transmission line via the corresponding PMD layer 120, and provides that data to the associated channel and the bond group module 205.

The host interface 105, framer/deframer modules, and PMD layers 120 can be implemented in conventional technology, and their particular configurations will vary depending on the given application (e.g., SHDSL or HDSL2). FIGS. 3 through 7 are diagrams illustrating the functionality and architecture of a data allocation mapping module in accordance with one embodiment of the present invention.

Bond Grouping Module—Transmit Architecture

Figure 3:
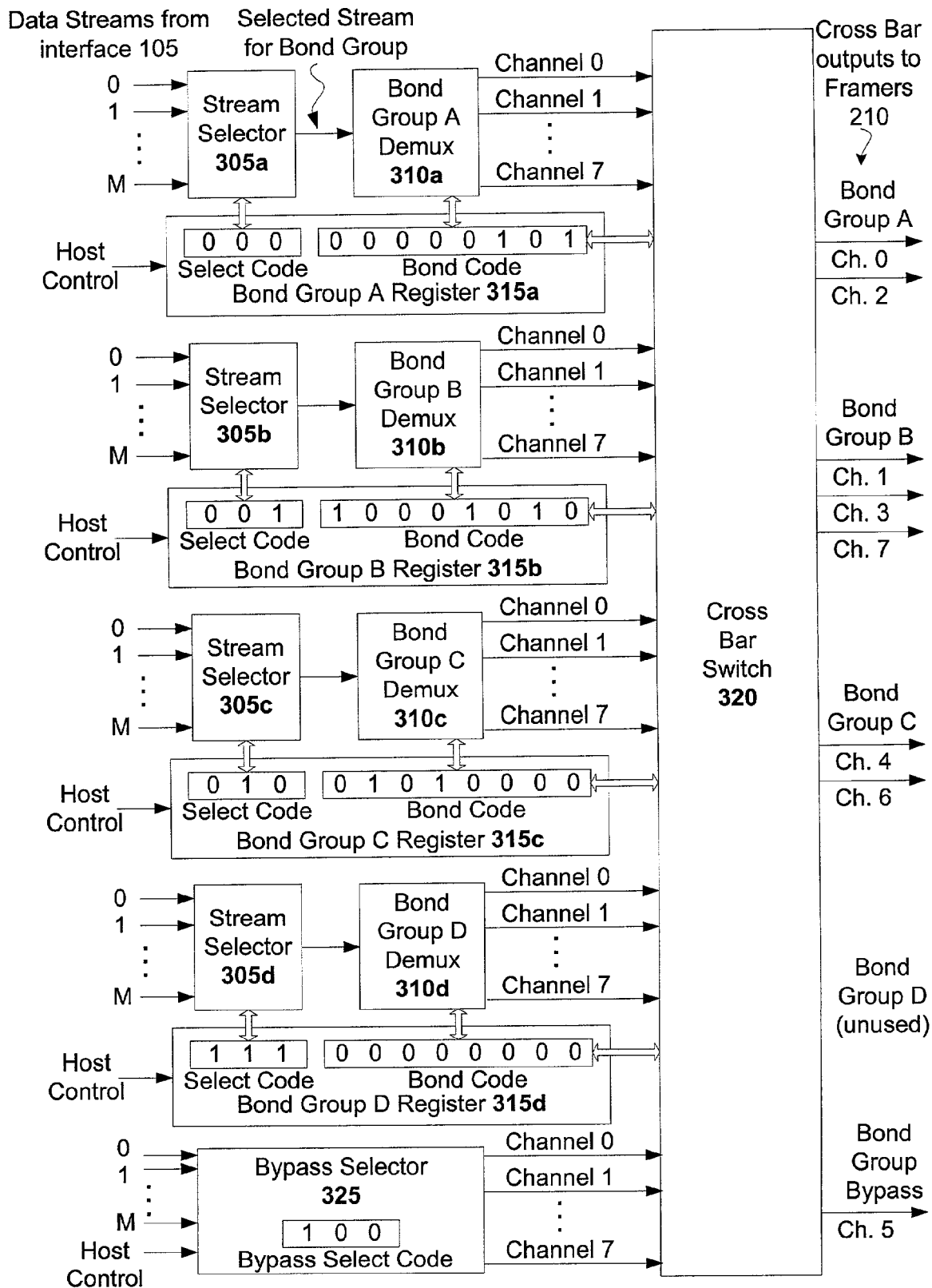
FIG. 3 is a block diagram illustrating transmission architecture of a bond grouping module in accordance with one embodiment of the present invention.

FIG. 3 is a block diagram illustrating transmission architecture of a bond grouping module in accordance with one embodiment of the present invention. This example architecture can be used to provide up to four bond groups each having two or more active channels (e.g., one bond group having eight active channels, four bond groups having 2 active channels each, or any other combination). The architecture includes four stream selectors 305a–d, four bond group demultiplexers (Demux) 310a–d, four bond group registers 315a–d, a cross bar switch 320, and a bypass selector 325. Serial data streams 0 through M from the user interface 105 are coupled to the bond grouping module, and provided to each of the four stream selectors 305a–d and to the bypass selector 325.

The bond group register 315 of each bond group includes a select code and a bond code. As can be seen, these codes can be provided from a local host by virtue of the host control information at connection time. Alternatively, the codes can be established during the initialization of the communication link (e.g., using handshake messaging or messages embedded in the activation frame). Alternatively, the codes can be set based on switch bank (e.g., 3-bit and 8-bit binary microswitches) coupled to each bond group register 315. In such an embodiment, the local host (e.g., network operator or other user) could manually set the switch bank to provide the desired codes.

Stream Selection

Each stream selector is configured to select one of the 0 to M serial data streams based on the select code, and provide that selected stream to the bond group demux 310. The configuration shown uses a 3-bit binary code thereby allowing up to eight serial data streams to be individually selected. A 3-to-8 line decoder can be used to translate the 3-bit code into a corresponding control line that switches in the selected stream (e.g., via a normally open relay that closes in response to the control line), while the other streams remain switched out. Alternatively, a N-bit select code can be used, where each bit of the code provides control to a switchable stream (e.g., via relay, pass-transistor, or other switching mechanism) thereby allowing up to N serial data streams to be individually selected. Other configurations will be apparent in light of this disclosure. Bypass selector 325 can be similarly configured to the stream selectors 305.

In alternative embodiments, a particular serial data stream can be provided directly to a bond group demux 310, or to the bypass mechanism (which can receive multiple streams depending on the configuration as will be apparent in light of this disclosure). In such an embodiment, no select codes or stream selectors 305,325 would be required. Likewise, if all of the available streams are provided to each bond group demux 310, then each bond group demux 310 can be programmed or otherwise configured to ignore all serial streams except a target stream, where the target stream can be established, for example, at connection time. The streams ignored by all bond group demux modules 310 could be provided to the bypass as a default.

In the example shown, the bypass select code of bypass selector 325 is 100. As such, bypass selector 325 selects serial data stream 5 for bypass. The data stream will therefore be transmitted over one channel (non-bonded channel). The select code of bond group A register 315*a* is 000. Stream selector 305*a* therefore selects serial data stream 0, and provides that stream to bond group A demux 310*a*. The select code of bond group B register 315*b* is 001. Stream selector 305*b* therefore selects serial data stream 1, and provides that stream to bond group B demux 310*b*. The select code of bond group C register 315*c* is 010. Stream selector 305*c* therefore selects serial data stream 2, and provides that stream to bond group C demux 310*c*.

The select code of bond group D register 315*d* is 111. In this embodiment, a select code of 111 can be used to indicate that no channel is selected (i.e., there is no eighth serial data stream). Stream selector 305*d* is therefore effectively disabled and does not select any stream. Other mechanisms for disabling the stream selector 305*d* will be apparent in light of this disclosure (e.g., enable logic of 3-to-8 line decoder). Alternatively, a particular serial data stream can be selected based on a default or arbitrary select code and provided to the bond group D demux 310*d*, which can effectively terminate the stream based on the corresponding bond code.

Bond Group Demultiplexer

Each bond group demux 310 is configured to receive the selected serial data stream, and to effectively demultiplex that stream onto two or more channels based on the corresponding bond code. The channels that carry the selected stream are said to be bonded to one another. The configuration shown uses an 8-bit binary code thereby allowing up to eight channels to be bonded together. A conventional round robin demultiplexing architecture can be used in the bond group demultiplexers 310. For example, bond group A register 315*a* specifies a bond code of 00000101, which defines bond group A as channels 0 and 2. The bond group A demux 310*a* will therefore couple a first data fragment (e.g., one nibble, byte or word) of the selected data stream to channel 0, the next data fragment of the stream to channel 2, the next data fragment to channel 0, and so on.

Similarly, bond group B register 315*b* specifies a bond code of 10001010, which defines bond group B as channels 1, 3 and 7. The bond group B demux 310*b* will therefore couple a first data fragment of the selected data stream to channel 1, the next data fragment of the stream to channel 3, the next data fragment to channel 7, the next data fragment to channel 1, and so on. Bond group C register 315*c* specifies a bond code of 01010000, which defines bond group C as channels 4 and 6. The bond group C demux 310*c* will therefore couple a first data fragment of the selected data stream to channel 4, the next data fragment of the stream to channel 6, the next data fragment to channel 4, and so on. Bond group D register 315*d* specifies a bond code of 00000000, which indicates the bond group D is empty (no channels). Thus, whatever serial data stream is provided to bond group D demux 310*c* (assuming one is provided) will not provided to the cross bar switch 320.

Figure 4A:
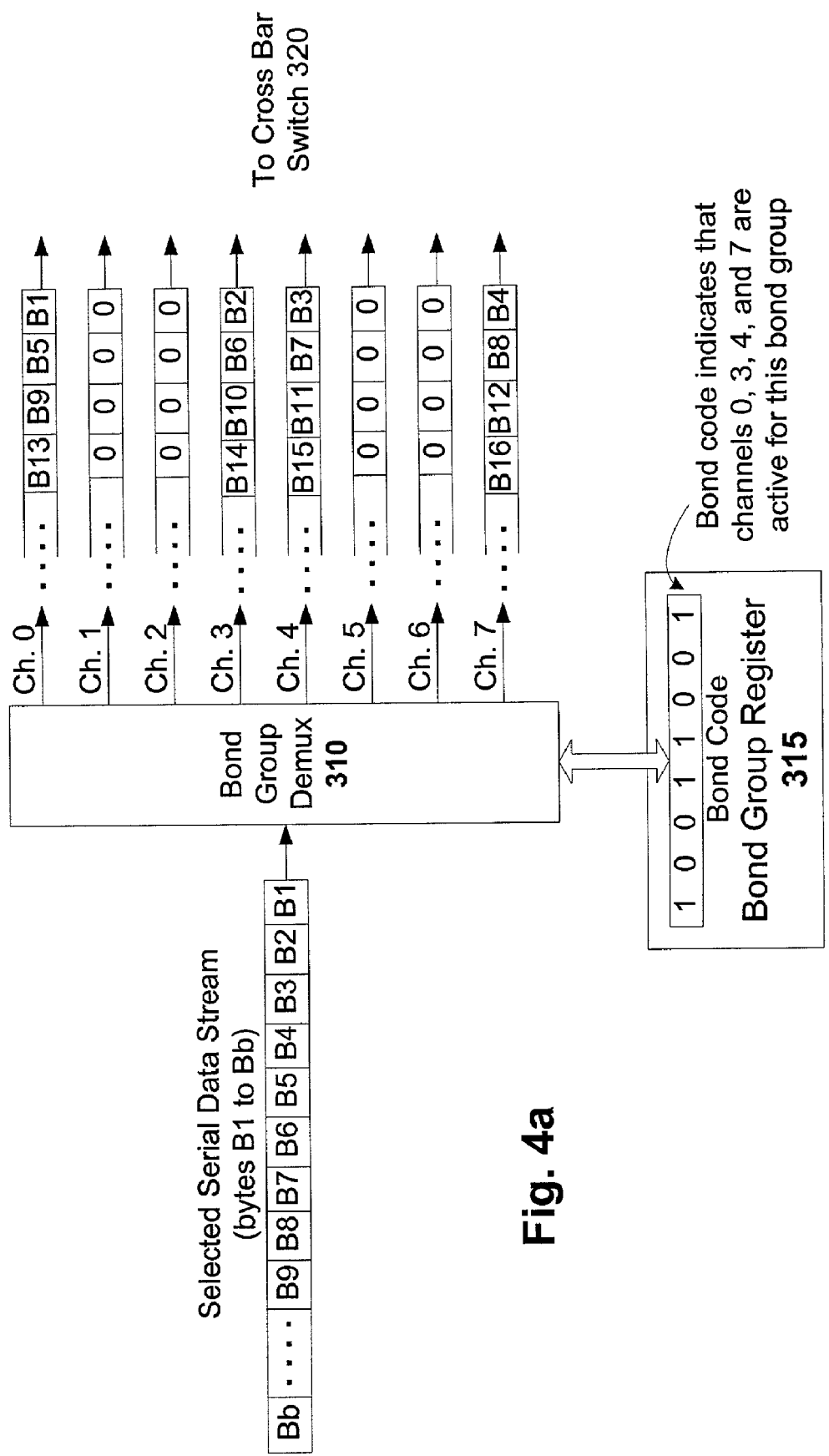
FIG. 4a is a diagram illustrating data stream flow through a bond group demultiplexer in accordance with one embodiment of the present invention.

FIG. 4*a* is a diagram illustrating data stream flow through a bond group demultiplexer in accordance with one embodiment of the present invention. The selected serial data stream is comprised of a number of contiguous sections or data fragments. In this example, each data fragment is one byte, starting with byte B1 and continuing through byte Bb. Other data fragment sizes can be used here as well. The example bond code is 10011001, which indicates that channels 0, 3, 4, and 7 are active for this bond group. Given a round robin demultiplexing architecture, byte B1 is output to channel 0, byte B2 is output to channel 3, byte B3 is output to channel 4, byte B4 is output to channel 7, byte B5 is output to channel 0, and so on as illustrated until all of the serial data stream is processed. The inactive outputs of the bond group demux 310 are zeroed in this embodiment.

Cross Bar Switch

Figure 5:
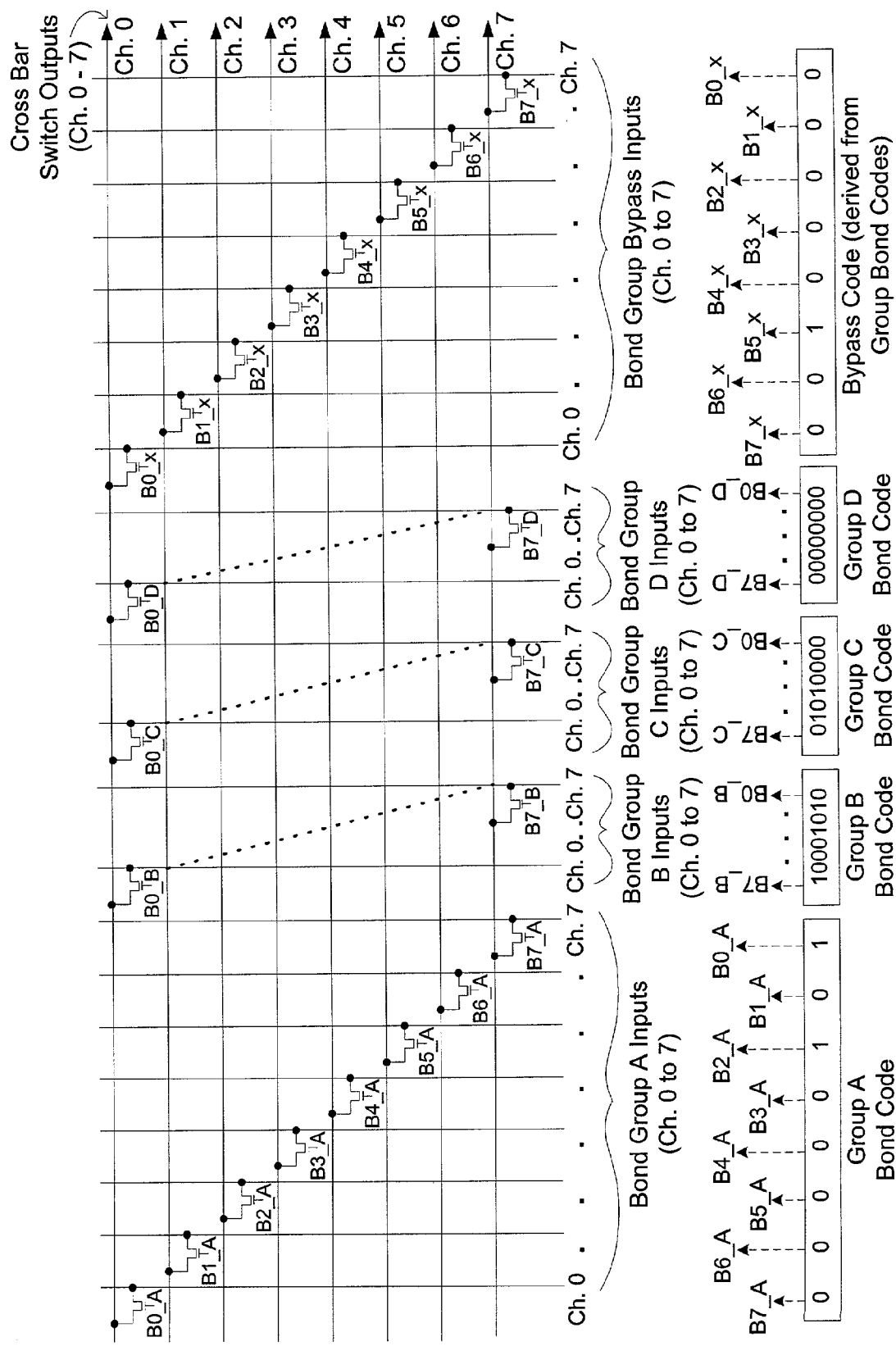
FIG. 5 is a diagram illustrating a cross bar switch configured in accordance with one embodiment of the invention.

The cross bar switch 320 receives the active channels output by the bond group demultiplexers 310, along with the respective bond codes. Inactive channels of each bond group demultiplexer 310 can be set to all logical zeroes, logical ones, or simply terminated (no output provided). Based on the bond code, the cross bar switch of the illustrated embodiment outputs a total of eight channels (0 to 7). Bond group A includes channels 0 and 2, bond group B includes channels 1, 3, and 7, bond group C includes channels 4 and 6, bond group D is unused or empty, and the bond group bypass is provided to channel 5. These eight outputs can be provided to framer modules 210 for transmission onto respective transmission lines (by way of a corresponding PMD layer 120). FIG. 5 illustrates a detailed embodiment of the cross bar switch 320.

FIG. 4*b* is a diagram illustrating bond group channel flow through a cross bar switch in accordance with one embodiment of the present invention. Note that channels 0 to 7 associated with only one bond group demux 310 are illustrated. In actuality, channels 0 to 7 of each bond group demux 310, as well as channels 0 to 7 of the bypass selector 325, are provided to the cross bar switch (along with respective bond codes). Thus, in this particular embodiment, there are forty channel inputs to the cross bar switch, and eight channel outputs (0 to 7). The cross bar switch 320 couples each of the active channels of the bond groups and any bypass channels to one of the eight output channels.

In the example illustrated, one of the bond groups provided from a bond group demux 310 is associated with a bond code of 10011001. This indicates that this particular bond group, channels 0, 3, 4, and 7 are active. As can be seen, the cross bar switch allows the active channels of the bond group to be coupled with the corresponding output channels. Thus, the data of active channel 0 (bytes B1, B5, B9, B13, etc.) is switched to output channel 0; the data of active channel 3 (bytes B2, B6, B10, B14, etc.) is switched to output channel 3; the data of active channel 4 (bytes B3, B7, B11, B15, etc.) is switched to output channel 4; and the data of active channel 7 (bytes B4, B8, B12, B16, etc.) is switched to output channel 7. The inactive channels of the bond group are not switched through by cross bar switch 320.

FIG. 5 is a diagram illustrating a cross bar switch configured in accordance with one embodiment of the invention. The cross bar switch (e.g., 320 of FIG. 3), which is configured here as a pass-transistor network, receives five groups of inputs: bond group A inputs, bond group B inputs, bond group C inputs, bond group D inputs and bond group bypass inputs. Each of these input groups includes channels 0 to 7, where any one of these eight channels can be active for only one group. For example, if channel 1 is active in bond group A, then channel 1 cannot be active in bond groups B, C, and D. As previously discussed, the active channels of a bond group are defined by the bond code associated with that group.

Here, the bond code of bond group A is 00000101, the bond code of bond group B is 10001010, the bond code of bond group C is 01010000, and the bond code of bond group D is 00000000. Thus, bond group A includes channels 0 and 2, bond group B includes channels 1, 3, and 7, bond group C includes 4 and 6, and bond group D is empty or unused. Note that once a bit position of a particular bond code is set (logic 1), that bit position in all other bond codes is logic 0. For example, bit 0 of group A's bond code is set to logic 1, while bit 0 of the bond codes for groups B, C and D is logic 0.

Further note that bits of each bond code can be individually used as enable lines to turn-on corresponding pass-transistors of the cross bar switch. As such, the bond code couples each active bond group input to a particular cross bar switch output. Each cross bar switch output is then operatively coupled to a transmission line (e.g., via a framer 210 and PMD layer 120). In this sense, the bond code defines the transmission line associated with each active channel. For instance, bit 0 of group A's bond code provides enable line B0_A, which is applied to the corresponding pass-transistor. When B0_A is set to logic 1, this pass-transistor turns-on thereby coupling the channel 0 input of bond group A to the channel 0 output of the cross bar switch. The pass transistors associated with enable lines B0_B, B0_C, B0_D, and B0_x are not turned-on because the enable line B0_A is the only line that can be logic 1 (based on the bond codes). This principle applies to each set of bond group pass-transistors.

Continuing, B2_A of bond group A is logic 1, which turns-on the pass transistor that couples the channel 2 input of bond group A to the channel 2 output of the cross bar switch. All other pass-transistors associated with bond group A are in their off states. In a similar fashion, B1_B of bond group B is logic 1, which turns-on the pass transistor that couples the channel 1 input of bond group B to the channel 1 output of the cross bar switch; B3_B of bond group B is logic 1, which turns-on the pass transistor that couples the channel 3 input of bond group B to the channel 3 output of the cross bar switch; and B7_B of bond group B is logic 1, which turns-on the pass transistor that couples the channel 7 input of bond group B to the channel 7 output of the cross bar switch. All other pass-transistors associated with bond group B are in their off states. Likewise, B4_C of bond group C is logic 1, which turns-on the pass transistor that couples the channel 4 input of bond group C to the channel 4 output of the cross bar switch; and B6_C of bond group C is logic 1, which turns-on the pass transistor that couples the channel 6 input of bond group C to the channel 6 output of the cross bar switch. All other pass-transistors associated with bond group C are in their off states. From the preceding discussion, it will be apparent that all pass-transistors associated with bond group D are in their off state, as enable lines B0_D through B7_D are all logic 0.

Thus, seven out of the eight possible output channels of the cross bar switch are accounted for: channels 0, 1, 2, 3, 4, 6, and 7. Said differently, channel 5 is the only output channel not bonded to another channel. This result can be further confirmed by logically ORing the four bond codes of groups A, B, C, and D. In this example, the result of the logic ORing produces 11011111, thereby indicating that bit 5 of each of the bond codes is 0. The result can be inverted to yield 00100000, and used as a bypass code. The bypass code in-turn provides enable lines to pass-transistors associated with the bond group bypass mechanism. Here, enable line B5_x of the bond group bypass mechanism is logic 1, which turns-on the pass transistor that couples the channel 5 input of the bond group bypass inputs to the channel 5 output of the cross bar switch. All other pass-transistors associated with bond group bypass mechanism are in their off states. Note that if so desired, channel bonding can be bypassed for all eight channels thereby allowing up to eight distinct serial data streams to be transmitted without the use of channel bonding.

Bond Grouping Module—Receive Architecture

Figure 6:
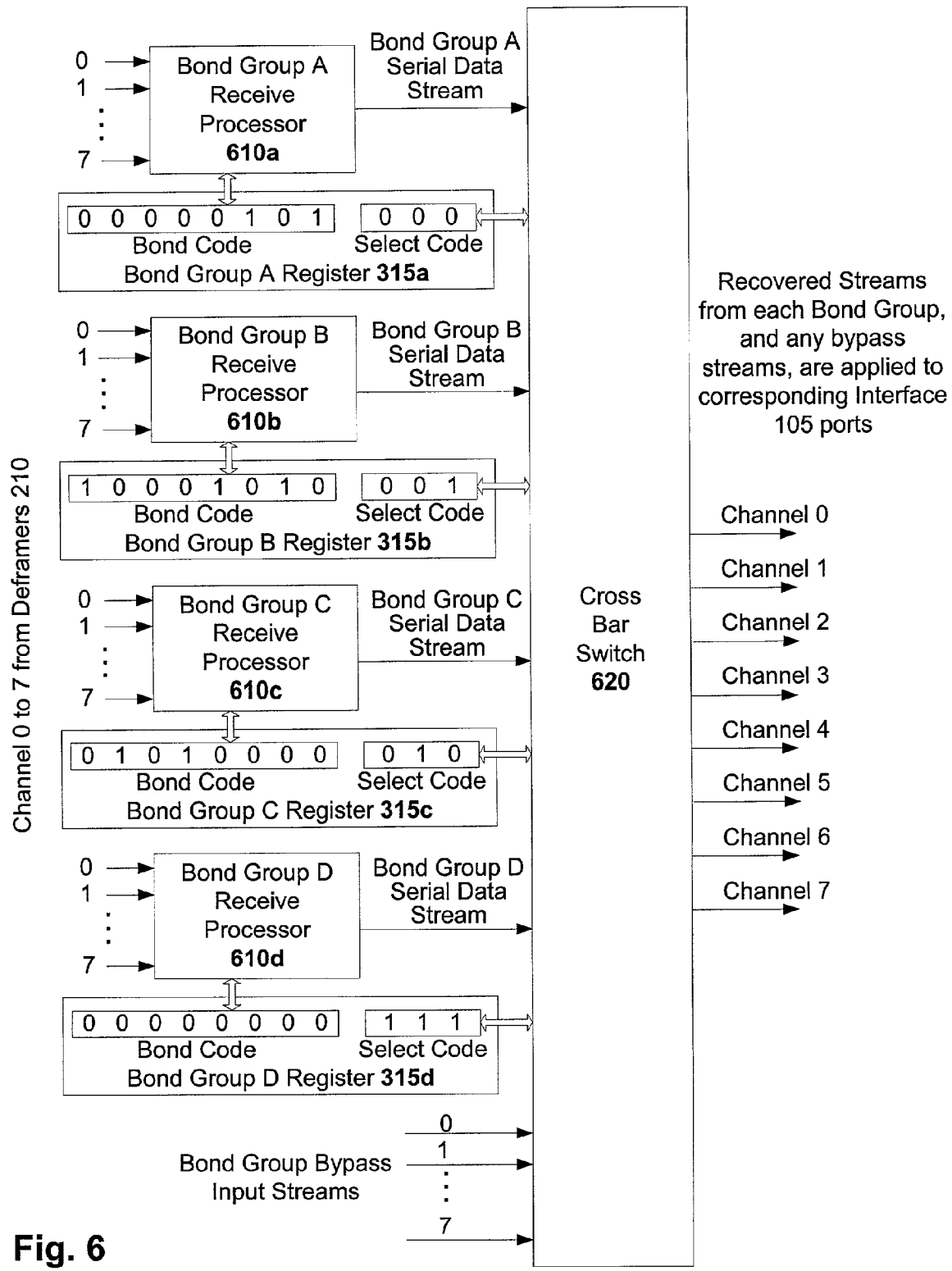
FIG. 6 is a block diagram illustrating receiver architecture of a bond grouping module in accordance with one embodiment of the present invention.

FIG. 6 is a block diagram illustrating receiver architecture of a bond grouping module in accordance with one embodiment of the present invention. This embodiment is complementary to the transmit architecture previously described. Up to four bond groups can be received, where each bond group includes two or more active channels. A bypass mechanism is also provided. The example architecture includes four bond group receive processors 610*a–d*, four bond group registers 315*a–d*, and a cross bar switch 620. Channels 0 through 7 from the deframers 210 are coupled to the bond grouping module, and provided to each of the four bond group receive processors 610*a–d*. In addition, each of channels 0 to 7 are provided to the cross bar switch 620 which allows for bond group bypass.

A bond group receive processor 610 effectively multiplexes the active channels of the corresponding bond group to render the original serial data stream. The bond code associated with the bond group defines the active channels of the group, and is accessed from the bond code register 315 by the bond group receive processor 610. The differential delay between the bonded channels is dynamically compensated for based on the channel having the greatest latency. The bond codes and the select codes can be established, for example, at connection time, or during a handshake session as previously described. Non-bonded channels (bypass serial data streams) are provided to the cross bar switch 620. The bypass code associated with these bypass streams is derived from the group bond codes as previously described. The cross bar switch 620 receives each of the original serial data streams and any bypass streams, as well as the associated select/bond codes, and couples those streams to the selected host interfaces 105. Note that any one of the recovered serial data streams channels can be provided to any one of the host interfaces 105.

Bond Group Receive Processor

Figure 7:
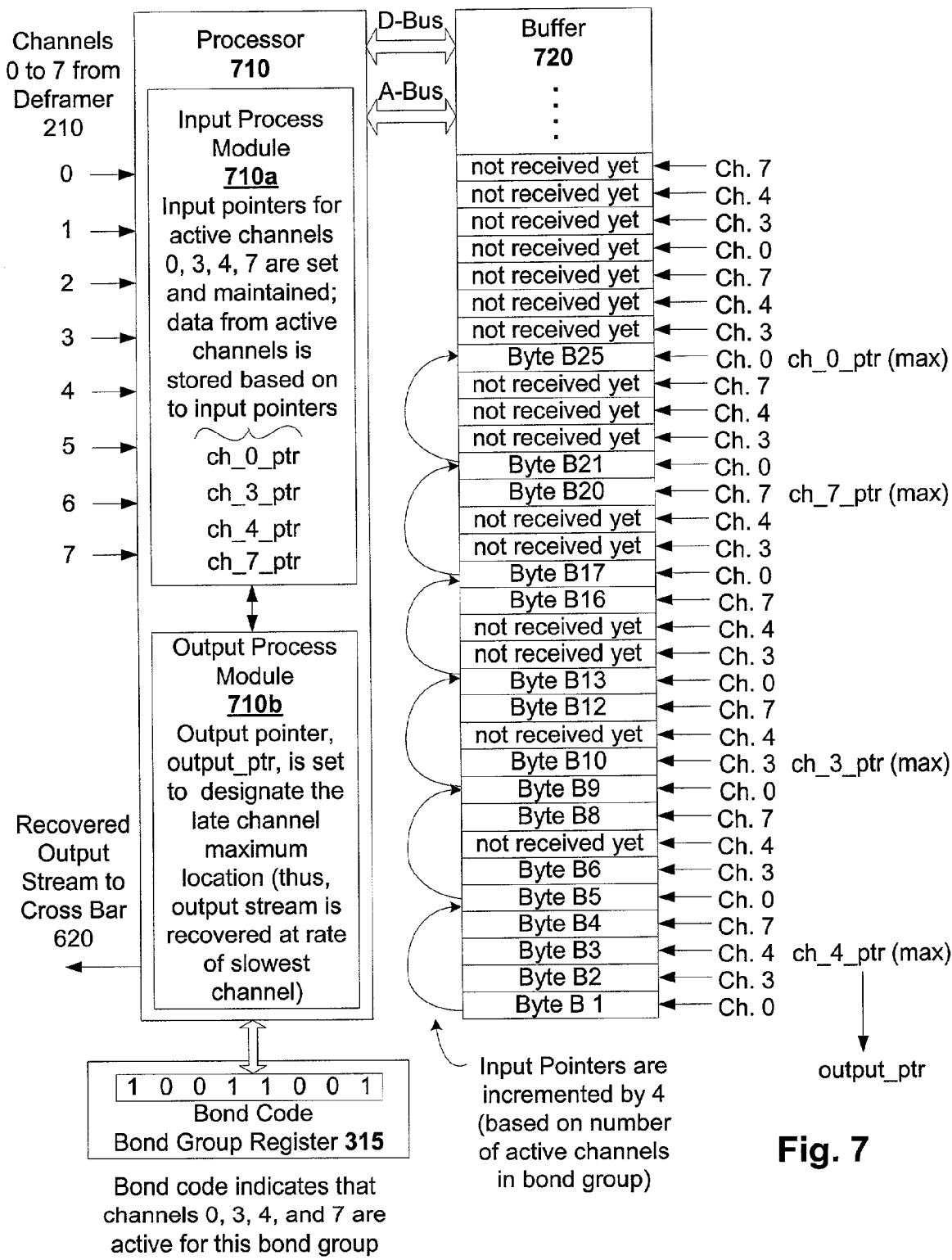
FIG. 7 is a block diagram illustrating a bond group receive processor configured in accordance with one embodiment of the present invention.

FIG. 7 is a block diagram illustrating a bond group receive processor configured in accordance with one embodiment of the present invention. The bond group receive processor includes processor 710 and a buffer 720. The processor 710, which includes an input process module 710*a* and an output process module 710*b*, can be implemented, for example, in purpose-built silicon or as a microcontroller unit or digital signal processor that is programmed to receive the input channels of the bond group, and store the user data from the active channels of that bond group in the buffer 720. Address and data busses (A-Bus and D-Bus) allow for communication between the processor 710 (including both input process module 710*a* and output process module 710*b*) and the buffer 720. The bond code of the corresponding bond code register 315 allows the input process module 710*a* to determine the active channels. In this example, channels 0, 3, 4, and 7 are active.

The input process module 710*a* initializes an input pointer for each of the active channels: ch_0_ptr, ch_3_ptr, ch_4_ptr, and ch_7_ptr. The user data from each active channel is received at a port of processor 710, and then incrementally stored by the input process module 710a in the buffer 720 based on the corresponding input pointer. Recall that (in reference to FIG. 4a) these active channels carry the user data of a serial data stream that was demultiplexed at byte size data fragments into the active channels for transmission. At the receiving node (e.g., customer premises), therefore, the channel data is similarly divided up into bytes by the input process module 710a for purposes of processing symmetry. In addition, the input pointers are incremented by the input process module 710a in such a way so that the byte size data fragments are stored in memory in accordance with their original contiguous sequence as shown in FIG. 7. In this sense, a bond group receive processor 610 effectively multiplexes the user data from the active channels back into the original serial data stream that was sent from the transmitting node (e.g., central office).

For example, the first byte of channel 0 is byte B1, which is stored at the location indicated by ch_0_ptr (e.g., initialized to the first location of buffer 720). The next byte received from channel 0 is byte B5. As there are four active channels in this bond group, each of the input pointers are incremented by four bytes. This incrementing can be carried out by the input process module 710a after each store. Thus, byte B5 is stored at the fifth byte location of buffer 720. The next byte of channel 0 is byte B9, which is stored at the ninth byte location of buffer 720, and so on. Similarly, the first byte of channel 3 is byte B2, which is stored at the location indicated by ch_3_ptr (e.g., initialized to the second location of buffer 720). The next byte received from channel 3 is byte B6, which is stored at the sixth byte location of buffer 720. The next byte of channel 3 is byte B10, which is stored at the tenth byte location of buffer 720, and so on.

Continuing with the example, the first byte of channel 4 is byte B3, which is stored at the location indicated by ch_4_ptr (e.g., initialized to the third location of buffer 720). The next byte received from channel 4 is byte B7, which will be stored at the seventh byte location of buffer 720. The next byte of channel 4 is byte B11, which will be stored at the eleventh byte location of buffer 720, and so on. Likewise, the first byte of channel 7 is byte B4, which is stored at the location indicated by ch_7_ptr (e.g., initialized to the fourth location of buffer 720). The next byte received from channel 7 is byte B8, which is stored at the eighth byte location of buffer 720. The next byte of channel 7 is byte B12, which is stored at the twelfth byte location of buffer 720, and so on.

Viewing the status of the illustrated buffer 720 as a snapshot in time, note that the user data from the active channels are not received at the same time. This is because the transmission lines corresponding to each channel in the bond group typically have different characteristics (e.g., diameter, insulation type, length, number and length of bridge taps, and exposure to impairments). Here, user data bytes 1, 5, 9, 13, 17, 21, and 25 from channel 0 are already buffered as indicated by the ch_0_ptr. This is the fastest of the four channels (including the corresponding lines) of the bond group. Channel 7 is up to user data byte B20 (ch_7_ptr) and is the next fastest channel of the bond group, while channel 3 is only up to user data byte B10 (ch_3_ptr). Only user data byte 3 from channel 4, however, is buffered as indicated by ch_4_ptr. This is the channel of the bond group having the greatest latency.

Dynamic Differential Delay Compensation

In order to dynamically compensate for this differential delay between the channels of the bond group, the output process module 710b maintains an output pointer (e.g., output_ptr) so that the output pointer's value will not exceed the value of the input pointer of the channel having the greatest latency. In particular, the output pointer designates a late channel maximum location in buffer 720, which in the example shown, is indicated by the input pointer, ch_4_ptr (max). Thus, the output pointer at that moment would be set by the output process module 710b to designate the third location of buffer 720 (where byte B3 is stored). This third location is referred to as the late channel maximum location. By keying off or otherwise tracking the late channel's maximum location, the serial data stream is recovered at the rate of the active channel having the greatest latency thereby allowing for dynamic compensation of differential delay between the active channels of a given bond group.

In one embodiment, dynamic compensation of differential delay between the active channels of a given bond group is accomplished by a minimum function included in processor 710 (e.g., as output process module 710b). For example, given the buffer 720 state illustrated in FIG. 7, a min[ch_0_ptr(max), ch_3_ptr(max), ch_4_ptr(max), ch_7_ptr(max)] would yield ch_4_ptr (max). The value of the output pointer, output_ptr, is therefore set to the value of input pointer ch_4_ptr(max). As such, the output serial data stream is recovered at the rate that the user data bytes from channel 4 are received. The recovered stream is provided to the corresponding input of the cross bar switch 620 by the output process module 710b. Note that if during operation, for example, the channel 7 latency becomes greater than the channel 4 (for whatever reason, such as exposure to an impairment), then the output process module 710b will dynamically adjust the output pointer to key off of ch_7_ptr (max) instead of ch_4_ptr(max) based on the minimum function. Thus, the dynamic differential delay compensation is efficiently realized.

In alternative embodiments, the differential delay can be statically compensated for by, for example, recovering the output serial stream after a pre-established delay based on measured performance of the late channel of a given bond group. Likewise, an oversized buffer 720 can be used that is configured so as receive the late channel user data without loosing any user data from the fastest channel (e.g., due to overflow). Such a configuration can be based on a maximum allowable differential delay if available. Once user data of the channel having the greatest latency is detected at a certain location in the buffer 720, the output serial stream could be recovered up to that location. Those buffer 720 locations could then be reused accordingly, and the process can be repeated until the output serial stream is fully recovered.

Note that FIG. 6 illustrates four separate bond group receive processors 610 (a through d). In an alternative embodiment, all four bond group receive processors 610 can be integrated into one processor. In such an embodiment, the overall bond group receive processor 610 would be similar to that illustrated in FIG. 7, but the processor 710 would have four sets of bond group inputs and four serial data stream outputs. Likewise, the processor 710 would maintain a set of input pointers and a corresponding output pointer for each set of bond group inputs (e.g., four input process modules 710a and four output process modules 710b). The buffer 720 could be partitioned or otherwise structured to provided four separate storage areas, one for each bond group. Alternatively, four separate buffers 720 could be operatively coupled (e.g., via D-Busses and A-Busses) to a single processor 710. Other configurations will be apparent in light of this disclosure.

Cross Bar Switch

Figure 8:
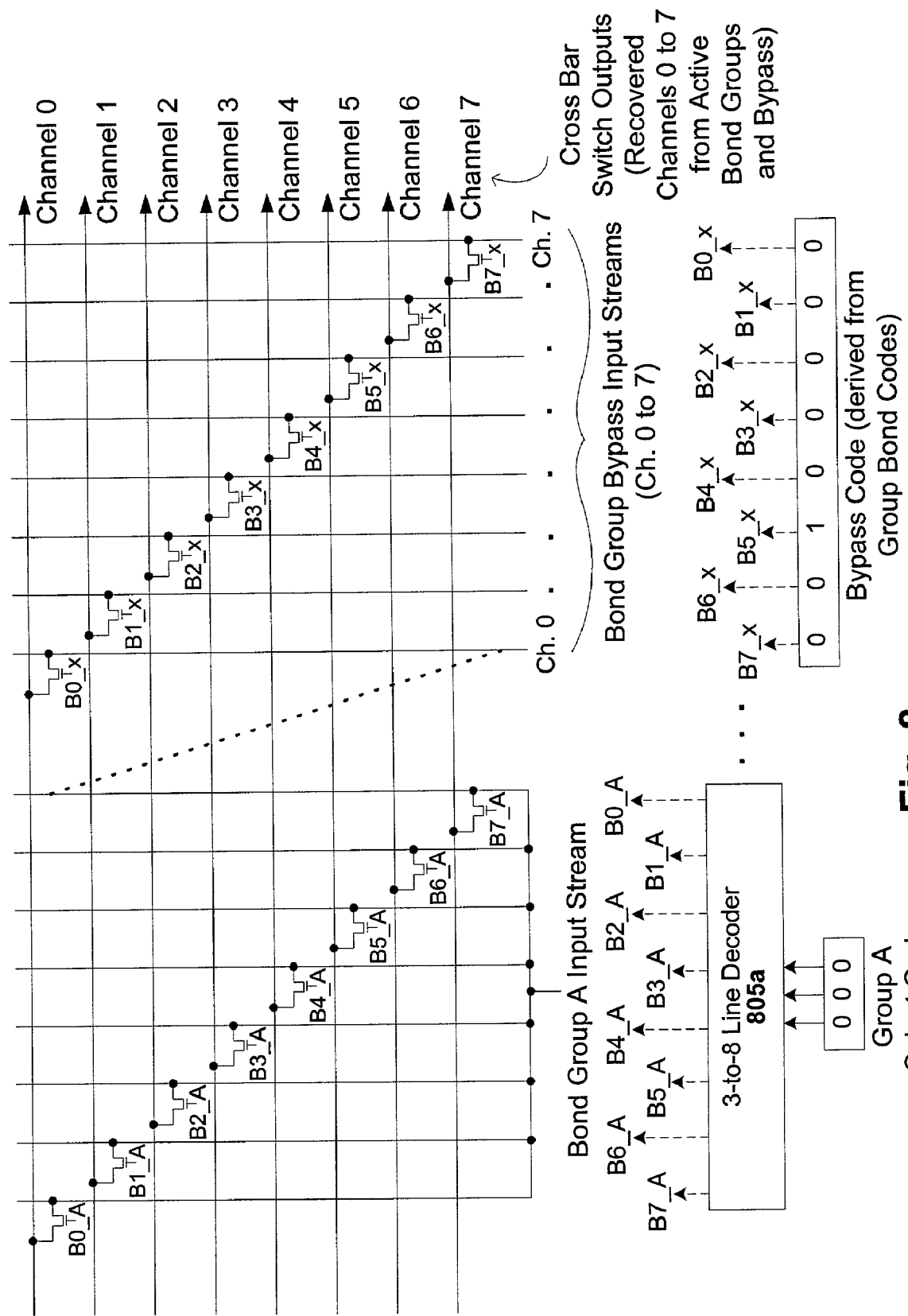
FIG. 8 is a diagram illustrating a cross bar switch configured in accordance with one embodiment of the invention.

FIG. 8 illustrates a diagram of a cross bar switch configured in accordance with one embodiment of the invention. The cross bar switch (e.g., 620 of FIG. 6) is configured as a pass-transistor network, and receives eight (M=8 in this example) serial data streams: bond group A input stream, bond group B input stream, bond group C input stream, bond group D input stream, and the bond group bypass input streams. Note that the bond group input streams and their respective pass-transistors are not illustrated for bond groups B, C, and D, but are configured similar to that shown for bond group A. Further note that any one input stream can be coupled to any one output of the cross bar switch. Each output (channels 0 to 7) of the cross bar switch can be associated with, for example, a different host interface 105 as previously discussed.

The corresponding select code is used to couple the input stream to the desired cross bar switch output. In this example, each 3-bit select code (e.g., from bond group registers 315a–d) is provided to a conventional 3-to-8 line decoder 805a–d, which translates the 3-bit code into a control line corresponding to the pass-transistor that will couple the input stream to the desired cross bar switch output. Alternative switching, control and decoding configurations will be apparent (e.g., an N-bit select code for N streams thereby eliminating the need for a 3-to-8 line decoder). In an alternative embodiment, the assignment of a recovered stream to a particular cross bar switch output is based on the least significant bit of the corresponding bond code. For example, given a group A bond code of 00000101, the least significant bit is the $2^0$-bit. Thus, the recovered bond group A stream would be assigned to the channel 0 output of the cross bar switch. Similarly, given a group C bond code of 01010000, the least significant bit is the $2^4$-bit. Thus, the recovered bond group C stream would be assigned to the channel 4 output of the cross bar switch. And so on. With such an embodiment, no 3-to-8 line decoders 805 or select code are required.

Note that the bond group bypass mechanism of the cross bar switch is configured similarly to the bypass mechanism of the cross bar switch discussed in reference to FIG. 5, and that discussion equally applies here. In short, the bypass code is derived from the bond codes, and is used to enable pass-transistors (e.g., B0_x to B0__7) for channels that were not bonded. Any such bypass channels are provided to the corresponding cross bar switch outputs based on the bypass code. All eight output channels of the cross bar switch in this embodiment, therefore, are provided to a corresponding host interface.

Implementation Details

Embodiments of the present invention can be implemented in hardware, software, firmware, or any combination thereof. For instance, the described transmit and receive architecture of the bond group module can be implemented in purpose-built silicon using conventional techniques. Although modules are illustrated as separate components, it will be apparent in light of this disclosure that various modules can be combined or otherwise integrated with one another. For instance, the architecture and functionality of the bond group module can be implemented in a device such as a single integrated circuit chip or chip set. Alternatively, the functionality of the bond group module can be implemented as software instructions (e.g., interacting functional subroutines) executing on one or more digital signal processors or other suitable processing environment (e.g., microcontroller unit) configured to receive a plurality of serial data streams and to provide a number communication channels that may be bonded together in accordance with the principles of the present invention. Other device, apparatus, or system implementations will be apparent in light of this disclosure.

The foregoing description of the embodiments of the invention has been presented for the purposes of illustration and description. It is not intended to be exhaustive or to limit the invention to the precise form disclosed. Many modifications and variations are possible in light of this disclosure. For example, an interface can be provided between the framer/deframer modules 210 and the bond grouping module 205, such as a shared memory. Data from the shared memory can be retrieved and coupled to a particular channel that will be multiplexed into a serial data stream. Likewise, data from a serial data stream can be demultiplexed into two or more channels, and provided to the shared memory before the data is framed and coupled to the corresponding transmission line. In another embodiment, an interface can be provided between the host interface 105 and the bond grouping module 205, such as a frame synchronization module. Such a module can be used to process the serial data streams applied to the bond grouping module into a desired serial protocol or other format. It is intended that the scope of the invention be limited not by this detailed description, but rather by the claims appended hereto.

What is claimed is:

1. A method for transmitting a serial data stream in a DSL communication system, the method comprising:

receiving a serial data stream to be transmitted, the serial data stream having a number of contiguous sections;

demultiplexing the serial data stream by section onto two or more active channels of a bond group, where a bond code defines the active channels of the bond group and a transmission line associated with each active channel; and sending data of the demultiplexed serial data stream via the active channels to respective transmission lines.

2. The method of claim 1 wherein sending the data includes framing the data.

3. The method of claim 1 wherein a number of serial data streams are received and each serial data stream is demultiplexed by section onto two or more active channels of a bond group, each bond group associated with a bond code that defines the active channels of its bond group and a transmission line associated with each active channel.

4. The method of claim 1 wherein another serial data stream is received and bypasses the bond group based on a bypass code that is derived from one or more bond codes.

5. The method of claim 4 further the another serial data stream is selected from a plurality of serial data streams based on a bypass select code.

6. The method of claim 1 wherein receiving the serial data stream includes selecting the serial data stream from a plurality of serial data streams based on a select code.

7. A method for receiving data of a serial data stream that was transmitted over two or more transmission lines in a DSL communication system, the method comprising:

receiving data of a serial data stream from two or more active channels of a bond group, where a bond code defines the active channels of the bond group;

multiplexing the data from the two or more active channels thereby recovering the serial data stream; and sending the recovered serial data stream to a corresponding host interface based on at least one of a bond code or a select code associated with the bond group.

8. The method of claim 7 wherein receiving the data includes deframing the data.

9. The method of claim 7 wherein data of a number of serial data streams are each received from two or more active channels of a bond group and the data from the active channels of each bond group is multiplexed thereby recovering each of the serial data streams.

10. The method of claim 9 wherein each bond group is associated with a bond code that defines the active channels of the bond group.

11. The method of claim 9 wherein each bond group is associated with a select code that specifies the corresponding host interface to which each recovered serial data stream is sent.

12. The method of claim 7 wherein a non-bonded serial data stream is received and is provided to a host interface based on a bypass code that is derived from one or more bond codes.

13. The method of claim 7 wherein multiplexing the data includes incrementally storing the data received from each active channel in locations designated by an input pointer associated with each active channel of the bond group.

14. The method of claim 13 wherein the serial data stream is recovered based on an output pointer that designates a late channel maximum location thereby allowing for dynamic compensation of differential delay between the active channels.

15. The method of claim 7 wherein the serial data stream is recovered at the rate of the active channel having the greatest latency thereby allowing for dynamic compensation of differential delay between the active channels.

16. A method for receiving data of a serial data stream that was transmitted over two or more transmission lines in a DSL communication system, the method comprising:
   receiving data of a serial data stream from two or more active channels of a bond group;
   multiplexing the data from the two or more active channels into a storage; and
   recovering the serial data stream based on an output pointer that designates a late channel maximum location of the storage thereby allowing for dynamic compensation of differential delay between the active channels.

17. The method of claim 16 wherein receiving the data includes deframing the data.

18. The method of claim 16 wherein data of a number of serial data streams are each received from two or more active channels of a bond group and the data from the active channels of each bond group is multiplexed into respective storage locations.

19. The method of claim 18 wherein each bond group is associated with a bond code that defines the active channels of the bond group.

20. The method of claim 18 wherein each bond group is associated with a select code that specifies a corresponding host interface to which each recovered serial data stream is sent.

21. The method of claim 16 wherein the bond group is associated with a bond code that defines the active channels of the bond group.

22. The method of claim 16 wherein the bond group is associated with a select code that specifies a corresponding host interface to which the recovered serial data stream is sent.

23. The method of claim 16 wherein a non-bonded serial data stream is received and is provided to a host interface based on a bypass code that is derived from one or more bond codes.

24. The method of claim 16 wherein multiplexing the data includes incrementally storing the data received from each active channel in locations of the storage designated by input pointers associated with each active channel of the bond group.

25. A device for transmitting a serial data stream in a DSL communication system, the device comprising:
   a bond group multiplexer adapted to receive a serial data stream having a number of contiguous sections, and to demultiplex the serial data stream by section onto two or more active channels of a bond group; and
   a bond code register operatively coupled to the bond group multiplexer for storing a bond code that defines the active channels of the bond group and a transmission line associated with each active channel.

26. The device of claim 25 further comprising:
   a cross bar switch operatively coupled to the bond group multiplexer and the bond code register adapted to send data of the demultiplexed serial data stream via the active channels to respective transmission lines based on the bond code.

27. The device of claim 26 further including a framer module that is operatively coupled to an output of the cross bar switch for framing the data.

28. A device for receiving data of a serial data stream that was transmitted over two or more transmission lines in a DSL communication system, the device comprising:
   a buffer for storing data;
   an input process module operatively coupled to the buffer, and adapted to receive data of a serial data stream from two or more active channels of a bond group, and to multiplex the data from the two or more active channels into the buffer;
   a bond code register operatively coupled to the input process module for storing a bond code that defines the active channels of the bond group; and
   an output process module operatively coupled to the input process module and the buffer, and adapted to recover the serial data stream based on an output pointer that designates a late channel maximum location of the buffer thereby allowing for dynamic compensation of differential delay between the active channels.

29. The device of claim 28 further comprising:
   a cross bar switch operatively coupled to the output process module and the bond code register, and adapted to send the recovered serial data stream to a corresponding host interface based on at least one of a bond code or a select code associated with the bond group.

30. The device of claim 28 further including a deframer module that is operatively coupled to the input process module for deframing the data.

* * * * *